United States Patent [19]
Rhule et al.

[11] Patent Number: 5,639,118
[45] Date of Patent: Jun. 17, 1997

[54] AIR BAG MODULE WITH INFLATION DETECTION DEVICE

[75] Inventors: Daniel Allen Rhule, Miamisburg; Michael Wayne Donegan, Bellbrook; James Lloyd Webber, Centerville, all of Ohio

[73] Assignee: General Motors Corporation, Detroit, Mich.

[21] Appl. No.: 544,816

[22] Filed: Oct. 18, 1995

[51] Int. Cl.⁶ .................................................. B60R 21/20
[52] U.S. Cl. ........................ 280/743.1; 280/743.2; 280/728.1
[58] Field of Search ...................... 280/743.1, 728.1, 280/743.2

[56] References Cited

U.S. PATENT DOCUMENTS

| | | | |
|---|---|---|---|
| 5,004,266 | 4/1991 | Miller et al. | 280/743.2 |
| 5,048,863 | 9/1991 | Henseler et al. | 280/743.1 |
| 5,186,488 | 2/1993 | Takano | 290/728.1 |
| 5,249,825 | 10/1993 | Gordon et al. | 280/743.1 |
| 5,308,113 | 5/1994 | Moriset | 280/743.1 |
| 5,310,215 | 5/1994 | Wallner | 280/739 |
| 5,333,903 | 8/1994 | Eyrainer et al. | 280/743.1 |
| 5,362,101 | 11/1994 | Sugiura et al. | 280/743.1 |
| 5,378,019 | 1/1995 | Smith et al. | 280/743.1 |
| 5,395,134 | 3/1995 | Gann et al. | 280/743.1 |
| 5,498,023 | 3/1996 | Adams et al. | 280/728.2 |

*Primary Examiner*—Christopher P. Ellis
*Attorney, Agent, or Firm*—Kathryn A. Marra

[57] ABSTRACT

An air bag module includes an inflation detection device. The air bag module includes an air bag, an inflator for generating inflator gas to inflate the air bag, and a breakable device disposed on the air bag. The breakable device has a broken condition when the air bag is inflated to a properly inflated condition and the breakable device has an unbroken condition when the air bag is inflated to less than the properly inflated condition. Upon air bag deployment, the breakable device is broken when the air bag is inflated to the properly inflated condition and the breakable device remains unbroken when the air bag is inflated to less than the properly inflated condition. Thus, the breakable device verifies that the air bag has been properly inflated after air bag deployment.

15 Claims, 3 Drawing Sheets

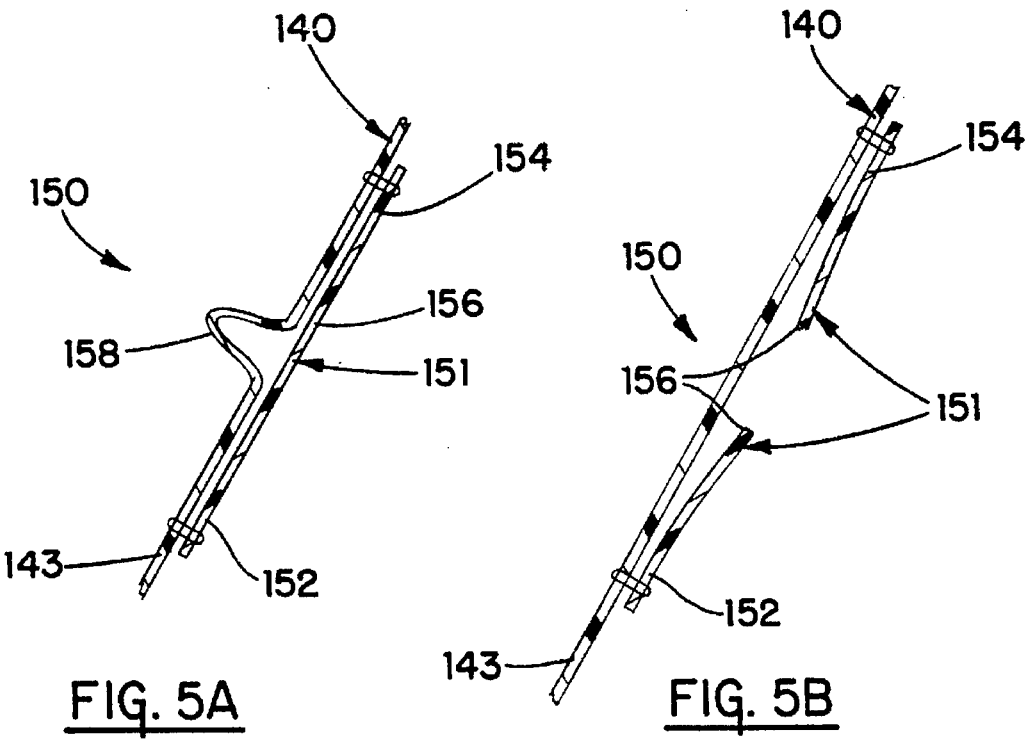
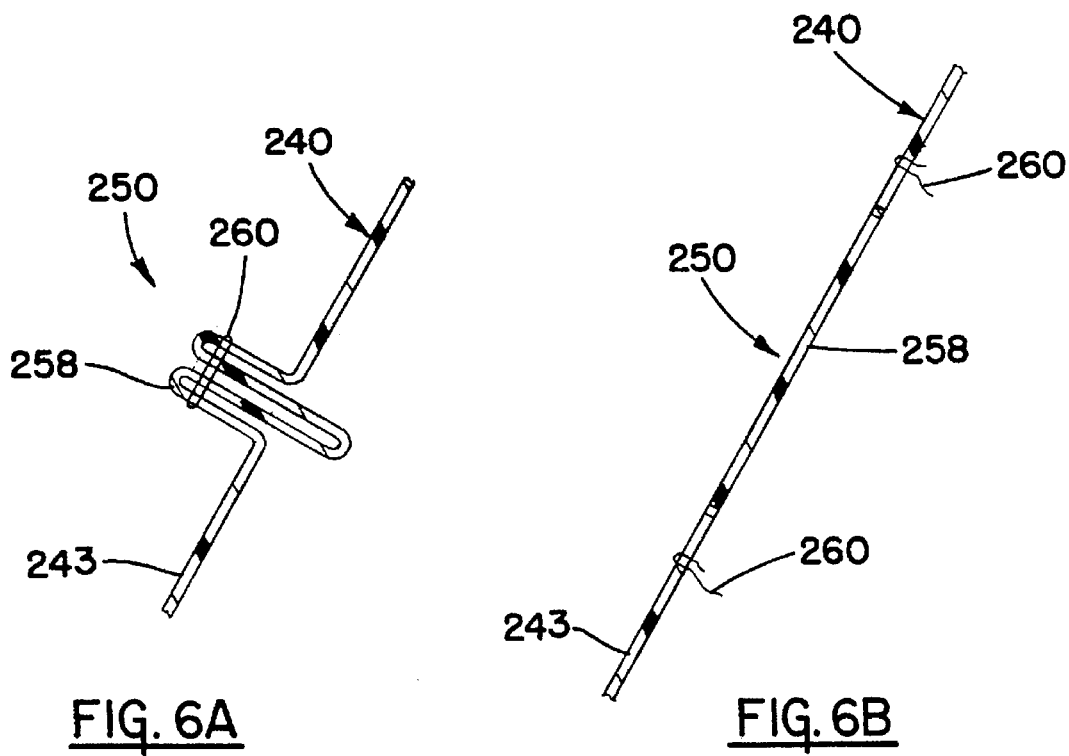

AIR BAG MODULE WITH INFLATION DETECTION DEVICE

This invention relates to a vehicle air bag module, and more particularly to a module having a device disposed on an air bag for verifying that the air bag was properly inflated during air bag deployment.

BACKGROUND OF THE INVENTION

It is well known in motor vehicles to provide an air bag module mounted beneath an opening in the instrument panel. The module typically includes a housing having walls defining a housing opening. The module also typically includes an air bag having a mouth portion secured to the housing and including an air bag opening. An inflator is mounted in the housing and discharges inflator gas out the housing opening and into the air bag opening to inflate the air bag when sensing predetermined vehicle conditions. The opening in the instrument panel is typically covered by a hinged cover door which is forced open by the deploying air bag.

It is well known in the prior art to provide a device for verifying that the inflator was sufficiently charged to properly inflate the air bag during deployment. These devices are typically internal to the inflator and detect the pressure level of compressed gases in the inflator, particularly in hybrid inflators. However, these pressure detection devices which are internal to the inflator are relatively expensive and further complicate the design and reliability of the inflator.

It is also known in the prior art to provide pleats either on the air bag or pleats on internal tethers of the air bag which include breakable seams. These pleats and breakable seams are structural components of the air bag which are designed to deter or alter the deployment pattern of the air bag. The breakable seams break at an intermediate deployment time when the air bag is partially inflated to allow the air bag to continue inflating to the fully inflated condition, for example, to control the shape of the bag during deployment. These pleats are typically located on the middle portion of the air bag or near the contact face of the air bag which contacts the occupant during deployment.

The prior art pleats and breakable seams are not designed to detect whether the air bag was properly inflated during air bag deployment since they are designed to break prior to full air bag inflation. In addition, these prior art pleats or breakable seams are structural components of the air bag which control or defer deployment of the air bag and thus do not detect whether proper air bag inflation has occurred. The internal pressure detection devices in an inflator can verify that inflator gas was sufficient for proper air bag inflation, but are expensive and complicated to provide.

SUMMARY

The present invention solves the shortcomings of the prior art by providing an air bag module having a detection device for verifying that the air bag was inflated to the properly inflated condition during air bag deployment. The breakable device is advantageously disposed on the air bag and does not require any alterations to the inflator while verifying that the inflator has provided sufficient output during air bag deployment. The device is relatively inexpensive and easy to manufacture and assemble. This breakable device is designed only to break upon proper inflation of the air bag and not upon partial inflation of the air bag. The breakable device is not a structural component of the air bag and leaves the air bag free to deploy in an unrestrained normal manner.

This breakable device is preferably located on the optimum location of the air bag for detecting proper inflation which is least affected by occupant interaction with the air bag. Also advantageously, this breakable device does not interfere with the regular performance and function of the air bag or the inflator and is not designed to alter the air bag shape during inflation.

These advantages are accomplished in the present invention by providing an air bag module including an inflation detection device. The air bag module includes an air bag, an inflator for generating inflator gas to inflate the air bag, and a breakable device disposed on the air bag. The breakable device has a broken condition when the air bag is inflated to a properly inflated condition and the breakable device has an unbroken condition when the air bag is inflated to less than the properly inflated condition. Upon air bag deployment, the breakable device is broken when the air bag is inflated to the properly inflated condition and the breakable device remains unbroken when the air bag is inflated to less than the properly inflated condition. Thus, the breakable device verifies that the air bag has been properly inflated after air bag deployment. Preferably, the air bag includes a mouth portion having an opening for receiving inflator gas therethrough and an air bag neck portion located directly adjacent and extending from the mouth portion. The breakable device is preferably located on the air bag neck portion for optimal detection of proper air bag inflation.

In a preferred form of the invention, the breakable device includes a patch of material having a narrow patch neck portion which breaks in tension upon proper inflation of the air bag. The breakable device preferably includes a patch of material having a first end anchored to the air bag, a second end anchored to the air bag, and a breakable patch neck portion located between the first end and the second end. Preferably, the air bag is made of an air bag material having an elongation and the patch is made of a patch material having an elongation which is less than the elongation of the air bag material.

Alternately, the breakable device may include a pleat and a breakable seam sewn on the air bag adjacent the pleat. Upon proper inflation of the air bag, the breakable seam breaks and the pleat unfolds and upon less than proper inflation of the air bag the breakable seam remains unbroken and the pleat remains folded. As another example, the breakable device may include a patch of material having a first end anchored to the air bag, a second end anchored to the air bag, and a breakable patch neck portion located between the first end and the second end. In addition, the air bag includes a pleat located adjacent the neck portion of the patch such that upon proper inflation of the air bag, the patch neck portion breaks and the pleat unfolds.

BRIEF DESCRIPTION OF THE DRAWINGS

Embodiments of the present invention are described, by way of example only, with reference to the accompanying drawings in which:

FIG. 5A is an enlarged view of a portion of the air bag and the breakable device as shown in FIG. 4A;

FIG. 5B is an enlarged view of a portion of the air bag and the breakable device as shown in FIG. 4B;

FIG. 6A is a view similar to FIG. 5A but showing another alternate embodiment of the invention having a breakable device being a pleat and a breakable seam on the air bag and showing the air bag in less than the properly inflated condition and the breakable device in the unbroken condition; and FIG. 6B is a view similar to FIG. 6A, but showing the air bag in the properly inflated condition and the breakable device in the broken condition.

DESCRIPTION OF THE PREFERRED EMBODIMENT

Figure 1:
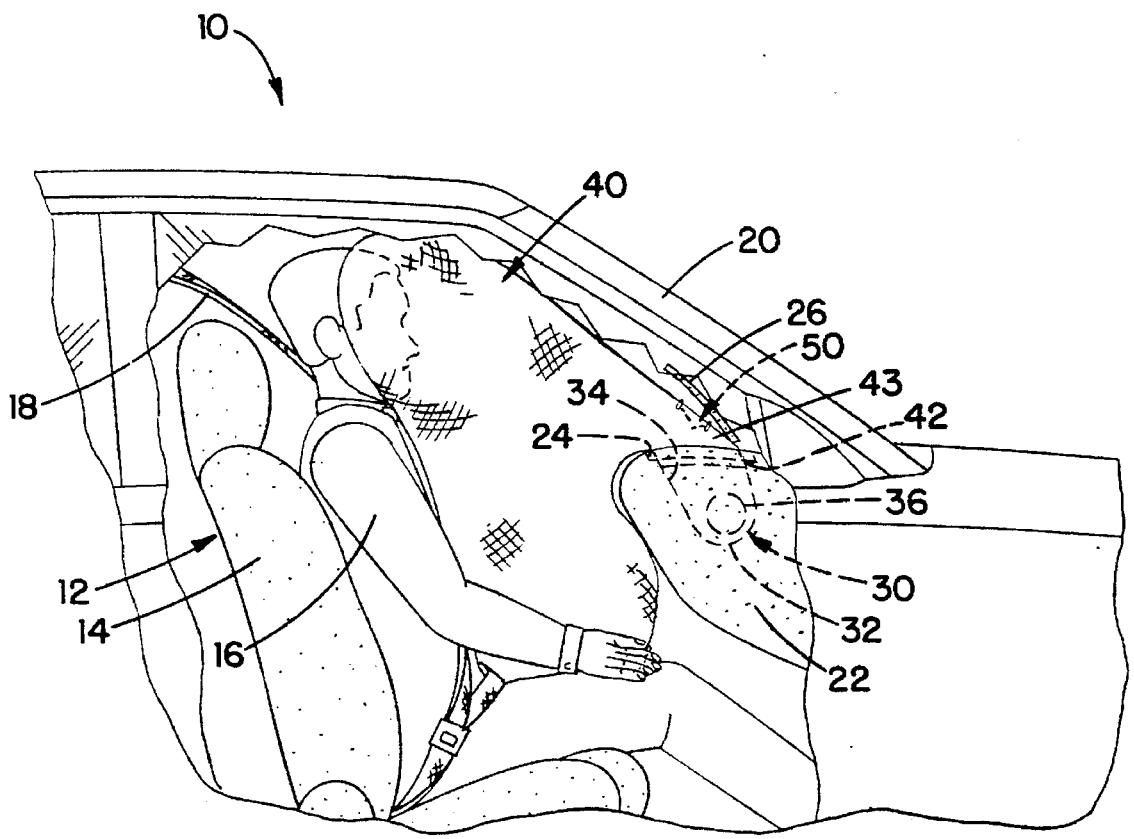
FIG. 1 is a perspective view of a vehicle partially-broken-away and showing a vehicle interior partially-broken-away and an air bag in the properly inflated condition and a breakable device in a broken condition.

Referring to FIG. 1, a vehicle 10 includes a vehicle interior 12 having a passenger seat 14 and an occupant 16 seated in the seat 14 and wearing a seat belt 18. The vehicle 10 further includes a windshield 20 and an instrument panel 22 located in the vehicle interior 12 behind the windshield 20. An air bag module 30 is mounted beneath an opening 24 in the instrument panel 22 across from the occupant 16 and is covered by a hinged cover door 26. The air bag module 30 includes a housing 32 having walls defining a housing opening 34, an inflator 36 for discharging inflator gas, and an air bag 40 for deployment upon inflation by the discharging inflator gas.

The inflator 36 may be of any typical construction for generating gas upon sensing predetermined vehicle conditions. The inflator 36 is typically mounted in the housing 32 beneath the air bag 40. The inflator 36 normally expels a sufficient amount of gas to inflate the air bag 40 to a properly inflated condition during air bag deployment.

The air bag 40 may be made from any conventional air bag material. The air bag 40 includes a mouth portion 42 secured to the housing 32 and located adjacent the inflator 36. The mouth portion 42 includes an air bag opening 44 through which inflator gas is received to inflate the air bag 40. An air bag neck portion 43 of the air bag 40 is located directly adjacent and extends from the mouth portion 42. The air bag 40 is normally stored in the housing 32 in a folded condition (not shown). Upon air bag deployment, the inflator 36 normally generates gas to inflate the air bag 40 to a properly inflated condition shown in FIG. 1. The properly inflated condition is a predetermined amount of inflation of the air bag 40 which will properly restrain the vehicle occupant 16. In the properly inflated condition, the air bag material typically expands to 110%–120% of its unstretched pre-deployment size. The amount of elongation of the air bag material during air bag deployment depends on the type of air bag material, the occupant 16 interaction with the air bag 40, and the location on the air bag 40 at which the elongation is measured. The air bag neck portion 43 experiences the greatest amount of elongation and the most consistent elongation during deployment since it is least affected by air bag 40 interaction with the occupant 16.

Figure 2:
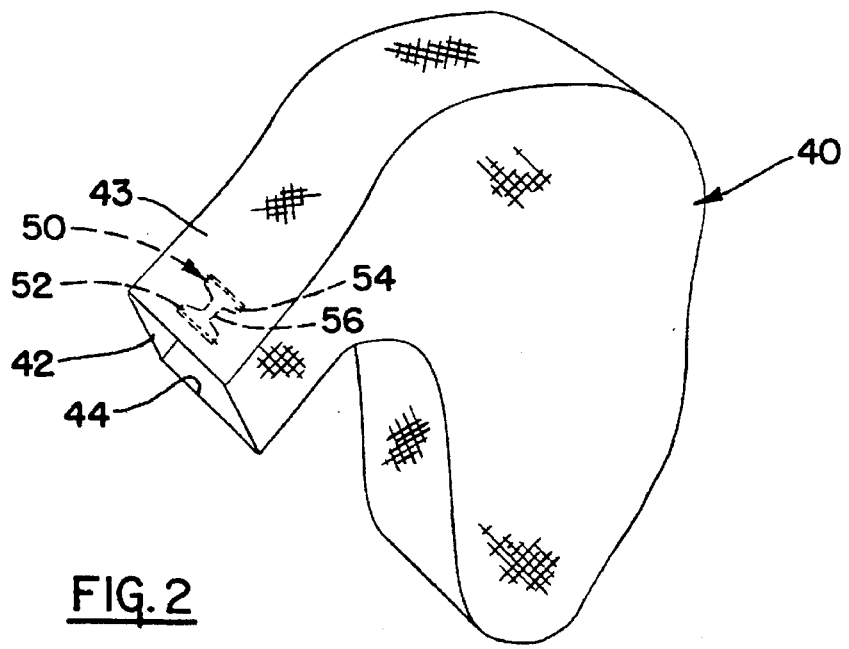
FIG. 2 is a perspective view of the air bag in less than the properly inflated condition and the breakable device in an unbroken condition.
Figure 3:
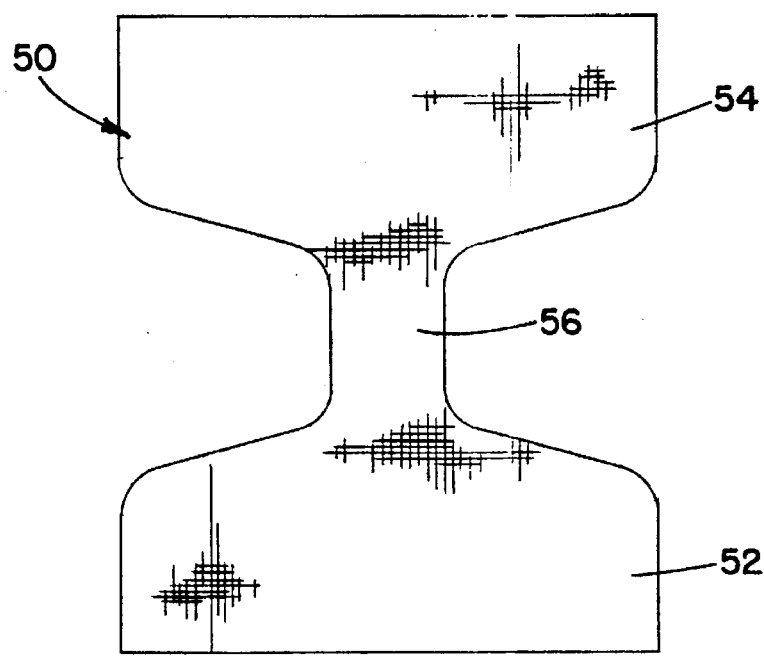
FIG. 3 is a plan view of the breakable device in the unbroken condition.

A breakable device 50 is disposed on the air bag 40. The breakable device 50 is preferably a patch made of a patch material. It is important that the patch material have a lower elongation than the air bag material. It is also preferred that the patch material have a low tensile strength and a low tear strength. The patch material must also be capable of being attached to the air bag 40 such as by sewing, bonding, or otherwise. Some preferable patch materials include "TYVEK", "FIBERGLASS" and "KEVLAR". The breakable device 50 is preferably cut to the approximate shape which is similar to a tensile test specimen, as shown in FIG. 3. The breakable device 50 is relatively small compared to the overall size of the air bag 40. More specifically, the breakable device 50 is preferably a planar patch of material and includes a widened first end 52, a widened second end 54, and a narrow, breakable patch neck portion 56 located between the first end 52 and the second end 54. Referring to FIGS. 1 and 2, the first end 52 and the second end 54 are securely anchored to the air bag 40. The breakable patch neck portion 56 has a width less than the width of the first and second ends 52, 54 and the patch neck portion 56 is not secured to the air bag 40. The breakable device 50 is attached to the air bag 40 only at the first and second ends 52, 54 so that the patch material between the first and second ends 52, 54, including the patch neck portion 56, is free to stretch upon inflation of the air bag 40, as described further hereinafter. The breakable device 50 being a patch is preferably attached to the inside of the air bag 40, but could alternately be attached to the outside of the air bag 40. While the breakable device 50 may be disposed anywhere on the air bag 40, the breakable device 50 is preferably disposed on the air bag neck portion 43 which has the greatest amount of and the most consistent elongation, as described above.

The breakable device 50 being a patch is sized and shaped such that the breakable device 50 only breaks upon proper inflation of the air bag 40 and such that the breakable device 50 does not break upon less than proper inflation of the air bag 40. This is accomplished by providing a patch material that has a lower elongation than the air bag material. This is also accomplished by providing a breakable device 50 being a patch having a narrow patch neck portion 56 which locally concentrates the tensile stresses on the patch neck portion 56 to ensure that the breakable device 50 will experience a tensile break upon proper inflation of the air bag 40. The patch material, patch size, patch location and width of the patch neck portion 56 are chosen such that the patch neck portion 56 will break upon experiencing tensile stresses produced by proper inflation of the air bag 40, but will not break upon experiencing tensile stresses produced by less than proper inflation of the air bag 40. It will be appreciated that although the breakable device 50 is disposed on the air bag 40, the breakable device 50 is not a structural member of the air bag 40 and does not alter in any way the normal unrestrained deployment of the air bag 40. Thus, the breakable device 50 can truly detect the proper inflation of the air bag 40, unlike prior art breakable seams or tethers which do not detect proper inflation, but instead control the proper inflation and deployment of an air bag.

During air bag deployment, the inflator 36 generates gas to inflate the air bag 40 which deploys out through the opening 24 in the instrument panel 22 and forces open the hinged cover door 26. When the air bag 40 is in the properly inflated condition as shown in FIG. 1, the first and second ends 52, 54 of the breakable device 50 are pulled apart by the stretching of the deploying air bag 40. Since the elongation of the air bag material is greater than the elongation of the patch material, the breakable device 50 is stretched and the tensile stresses are concentrated on the patch neck portion 56 of the breakable device 50 which breaks in tension. Thus, when the air bag 40 is properly inflated, the breakable device 50 is in the broken condition and thus verifies that the air bag 40 was properly inflated during deployment. When the air bag 40 is inflated to less than the properly inflated condition during air bag deployment, the stretching of the air bag 40 and breakable device 50 is insufficient to elongate the patch neck portion 56 to its breaking point such that the breakable device 50 remains in the unbroken condition as shown in FIG. 2.

It will be understood that a person skilled in the art may make modifications to the preferred embodiment shown herein within the scope and intent of the claims. Although the preferred embodiment shows a passenger side module 30, it will be appreciated that the breakable device 50 could be disposed on the air bag 40 of an air bag module located anywhere in the vehicle 10. Although the preferred embodiment shows the air bag module 30 including a breakable device 50 being a patch disposed on the air bag 40, many other alternate breakable devices are possible.

Figure 4A:
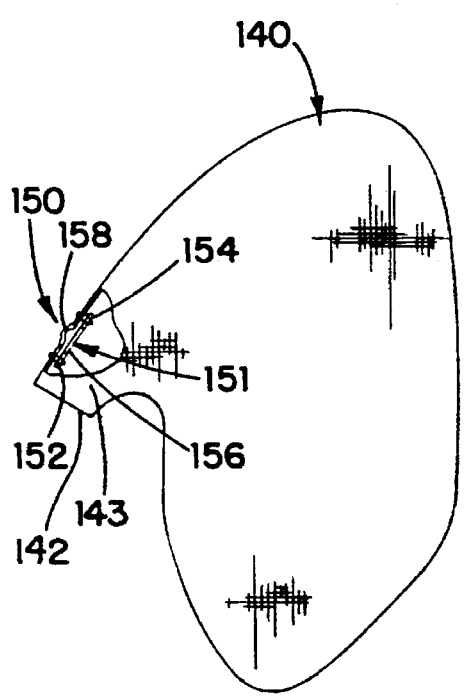
FIG. 4A is an alternate embodiment of the invention having a breakable device including a patch and a pleat and showing a side view of an air bag in the less than properly inflated condition and the breakable device in the unbroken condition.
Figure 4B:
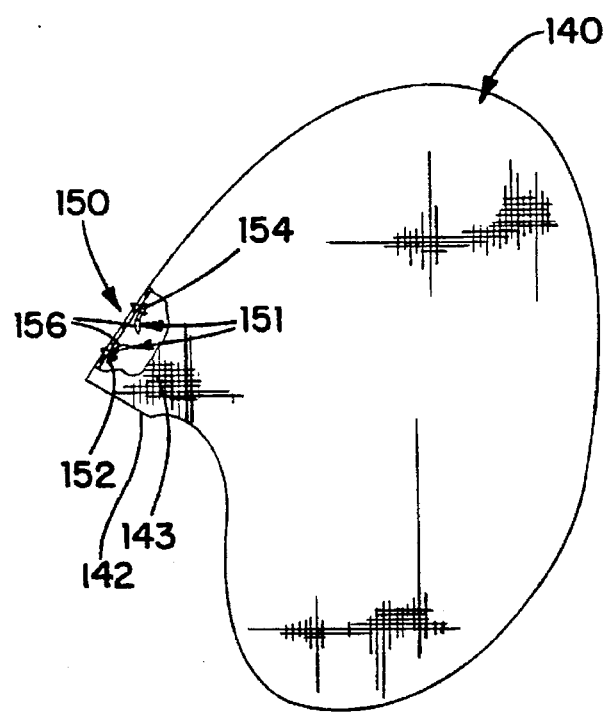
FIG. 4B is a view similar to FIG. 4A, but showing the air bag in the properly inflated condition and the breakable device in the broken condition.

For example, FIGS. 4A, 4B, 5A and 5B show an alternate embodiment of a breakable device 150 for use with the air bag module 30 of FIG. 1. An air bag 140 includes a mouth portion 142 for receiving inflator gas therethrough to inflate the air bag 140. An air bag neck portion 143 is directly adjacent and extends from the mouth portion 142 of the air bag 140. A breakable device 150 includes a patch 151 disposed on the air bag neck portion 143 and having a first end 152 and a second end 154 each anchored to the air bag 140 and having a patch neck portion 156 located between the first and second ends 152, 154 and having a narrow width. The patch 151 preferably has a shape similar to the breakable device 50 being a patch as shown and described in FIGS. 1–3. In addition to the patch 151, the breakable device 150 also includes a pleat 158 in the air bag material aligned with the patch neck portion 156 of the patch 151. When the air bag 140 is deployed to the properly inflated condition as shown in FIGS. 4B and 5B, the first and second ends 152, 154 of the patch 151 are sufficiently pulled apart by the stretching air bag 140 such that the patch neck portion 156 of the patch 151 is elongated and broken and the pleat 158 is unfolded. When the air bag 140 is inflated to less than the properly inflated condition, the air bag 140 is not sufficiently stretched to elongate and break the patch neck portion 156 of the patch 151 and the pleat 158 remains folded as shown in FIGS. 4A and 5A.

As another example, FIGS. 6A and 6B show another alternate embodiment of a breakable device 250 for use with the air bag module 30 of FIG. 1. An air bag 240 includes a mouth portion 242 for receiving inflator gas therethrough to inflate the air bag 240. An air bag neck portion 243 is located directly adjacent and extends from the mouth portion 242 of the air bag 240. A breakable device 250 includes an air bag pleat 258 disposed on the air bag neck portion 243 of the air bag 240 and a breakable seam 260 sewn to releasably secure the pleat 258 in the folded condition. When the air bag 240 is deployed to the properly inflated condition as shown in FIG. 6B, the folds of the pleat 258 are pulled apart by the stretching air bag 240 a sufficient amount such that the breakable seam 260 is broken and the pleat 258 is unfolded. When the air bag 240 is inflated to less than the properly inflated condition, the air bag 240 is not sufficiently stretched to break the breakable seam 260 and the pleat 258 remains folded as shown in FIG. 6A.

While the present invention has been described as carried out in a specific embodiment thereof, it is not intended to be limited thereby but is intended to cover the invention broadly within the scope and spirit of the claims.

The embodiments of the invention in which an exclusive property or privilege is claimed are defined as follows:

1. An air bag module for a vehicle, the air bag module comprising:
   an air bag;
   an inflator for generating inflator gas to inflate the air bag; and
   an inflation detection device so constructed and disposed on the air bag as to detect proper or improper inflation of said air bag upon deployment, the detection device comprising:
   a breakable device having a broken condition when the air bag is inflated to a properly inflated condition and the breakable device having an unbroken condition when the air bag is inflated to less than the properly inflated condition;
   whereby upon air bag deployment, the breakable device is broken when the air bag is inflated to the properly inflated condition and the breakable device remains unbroken when the air bag is inflated to less than the properly inflated condition.

2. The air bag module of claim 1 wherein the air bag includes a mouth portion having an opening for receiving inflator gas therethrough and an air bag neck portion located directly adjacent and extending from the mouth portion and wherein the breakable device is located on the air bag neck portion.

3. The air bag module of claim 1 wherein the breakable device is disposed on the air bag while leaving the air bag free for unrestrained normal deployment.

4. The air bag module of claim 1 wherein the air bag is made of an air bag material having an elongation and wherein the breakable device includes a patch made of a patch material having an elongation which is less than the elongation of the air bag material.

5. The air bag module of claim 1 wherein the breakable device includes a patch of material having opposing ends secured to the air bag.

6. The air bag module of claim 1 wherein the breakable device includes a patch of material having a breakable narrow patch neck portion which breaks in tension upon proper inflation of the air bag.

7. The air bag module of claim 1 wherein the breakable device includes a patch of material having a first end anchored to the air bag, a second end anchored to the air bag, and a breakable patch neck portion located between the first end and the second end.

8. The air bag module of claim 7 wherein the patch of material has a tensile strength such that the patch neck portion breaks in tension upon proper inflation of the air bag.

9. The air bag module of claim 7 wherein the patch neck portion has a width less than a width of the first end and less than a width of the second end.

10. The air bag module of claim 7 wherein the air bag includes a mouth portion having an opening for receiving inflator gas therethrough and an air bag neck portion extending from the mouth portion and wherein the patch is located on the air bag neck portion.

11. The air bag module of claim 7 wherein the air bag is made of an air bag material having an elongation and wherein the patch is made of a patch material having an elongation which is less than the elongation of the air bag material.

12. The air bag module of claim 1 wherein the breakable device includes a pleat and a breakable seam sewn on the air bag adjacent the pleat whereby upon proper inflation of the air bag, the breakable seam breaks and the pleat unfolds and upon less than proper inflation of the air bag the breakable seam remains unbroken and the pleat remains folded.

13. The air bag module of claim 12 wherein the air bag includes a mouth portion having an opening for receiving inflator gas therethrough and an air bag neck portion extending from and directly adjacent the mouth portion and wherein the pleat and breakable seam are located on the air bag neck portion.

14. The air bag module of claim 1 wherein the breakable device includes a patch of material having a first end anchored to the air bag, a second end anchored to the air bag, and a breakable patch neck portion located between the first end and the second end and wherein the air bag includes a pleat located adjacent the patch neck portion of the patch whereby upon proper inflation of the air bag, the patch neck portion breaks and the pleat unfolds.

15. The air bag module of claim 14 wherein the air bag includes a mouth portion having an opening for receiving inflator gas therethrough and an air bag neck portion directly adjacent and extending from the mouth portion and wherein the patch and pleat are located on the air bag neck portion.

* * * * *